US010205989B2

(12) United States Patent
Alsina et al.

(10) Patent No.: US 10,205,989 B2
(45) Date of Patent: Feb. 12, 2019

(54) OPTIMIZED STORAGE OF MEDIA ITEMS

(71) Applicant: Apple Inc., Cupertino, CA (US)

(72) Inventors: Thomas Alsina, Saratoga, CA (US); Cody D. Jorgensen, San Jose, CA (US); Edward T. Schmidt, Burlingame, CA (US); James H. Callender, San Francisco, CA (US); Matthew J. Cielak, San Francisco, CA (US); Taylor G. Carrigan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 15/273,406

(22) Filed: Sep. 22, 2016

(65) Prior Publication Data

US 2017/0359435 A1    Dec. 14, 2017

Related U.S. Application Data

(60) Provisional application No. 62/348,974, filed on Jun. 12, 2016.

(51) Int. Cl.
| | |
|---|---|
| *H04L 29/06* | (2006.01) |
| *H04N 21/81* | (2011.01) |
| *H04N 21/414* | (2011.01) |
| *H04N 21/433* | (2011.01) |
| *H04N 21/4335* | (2011.01) |

(52) U.S. Cl.
CPC ......... *H04N 21/4331* (2013.01); *H04L 65/60* (2013.01); *H04N 21/41407* (2013.01); *H04N 21/4335* (2013.01); *H04N 21/8113* (2013.01)

(58) Field of Classification Search
CPC ............. H04L 67/2842; H04L 67/2852; H04L 69/329; H04L 29/06; H04N 21/23106
See application file for complete search history.

(56) References Cited

U.S. PATENT DOCUMENTS

| | | | | |
|---|---|---|---|---|
| 5,848,241 A | * | 12/1998 | Misinai | G06F 9/54 |
| | | | | 709/213 |
| 6,546,422 B1 | * | 4/2003 | Isoyama | H04L 67/02 |
| | | | | 707/999.01 |
| 8,676,904 B2 | * | 3/2014 | Lindahl | G10L 15/30 |
| | | | | 709/206 |

(Continued)

FOREIGN PATENT DOCUMENTS

EP        2325761        5/2011

*Primary Examiner* — Ninos Donabed
(74) *Attorney, Agent, or Firm* — Blank Rome LLP (57) ABSTRACT

The present technology is for optimizing storage on a computing device. A media application on the computing device can allocate a minimum amount of storage on the computing device. The media application can further be configured to automatically download and store media items added to a media library of an account associated with the computing device. The combination of these features can put strain on computing devices with limited amounts of storage. Accordingly, the present technology can automatically delete media items in cache to allow media items to be automatically downloaded, or allow other uses of storage by other applications on the computing device, while also preserving the minimum amount of storage of media items on the computing device.

18 Claims, 9 Drawing Sheets

(56) References Cited

U.S. PATENT DOCUMENTS

| | | | | |
|---|---|---|---|---|
| 9,001,047 | B2* | 4/2015 | Forstall | G06F 1/1626 345/156 |
| 2003/0105747 | A1* | 6/2003 | Ishida | G06F 3/0601 |
| 2003/0105748 | A1* | 6/2003 | Ishida | G06F 17/30749 |
| 2003/0106068 | A1* | 6/2003 | Ishida | H04N 5/4401 725/134 |
| 2003/0115421 | A1* | 6/2003 | McHenry | H04L 29/06 711/133 |
| 2006/0082068 | A1* | 4/2006 | Patchen | A63F 9/183 273/430 |
| 2007/0174467 | A1* | 7/2007 | Ballou, Jr. | H04L 63/0838 709/227 |
| 2008/0064351 | A1* | 3/2008 | Landschaft | H04W 4/02 455/187.1 |
| 2009/0070533 | A1* | 3/2009 | Elazary | G06F 12/12 711/133 |
| 2009/0083279 | A1* | 3/2009 | Hasek | H04L 67/2823 |
| 2010/0312861 | A1* | 12/2010 | Kolhi | H04L 67/28 709/219 |
| 2011/0291985 | A1* | 12/2011 | Wakako | G06F 3/04817 345/174 |
| 2012/0290790 | A1* | 11/2012 | Meirosu | G06F 12/121 711/118 |
| 2013/0205089 | A1* | 8/2013 | Soerensen | G06F 12/0811 711/122 |
| 2013/0325942 | A1* | 12/2013 | Chen | H04L 65/4084 709/204 |
| 2014/0074959 | A1* | 3/2014 | Alsina | H04H 60/46 709/213 |
| 2014/0122471 | A1* | 5/2014 | Houston | G06F 17/3089 707/731 |
| 2014/0122995 | A1* | 5/2014 | Beckmann | G06F 17/3089 715/234 |
| 2014/0136644 | A1* | 5/2014 | Tuononen | H04L 67/2852 709/213 |
| 2014/0215156 | A1* | 7/2014 | Park | G06F 12/0888 711/119 |
| 2014/0337458 | A1* | 11/2014 | Barton | H04L 67/2847 709/213 |
| 2015/0026257 | A1* | 1/2015 | Balakrishnan | H04N 21/233 709/204 |
| 2015/0052565 | A1 | 2/2015 | Farrell et al. | |
| 2015/0067750 | A1 | 3/2015 | Taylor et al. | |
| 2015/0193347 | A1 | 7/2015 | Kluesing et al. | |
| 2015/0276421 | A1* | 10/2015 | Beaurepaire | H04W 4/027 701/400 |
| 2015/0334204 | A1 | 11/2015 | Bilinski et al. | |
| 2016/0255535 | A1* | 9/2016 | De Foy | H04L 67/2804 370/236 |
| 2016/0259496 | A1* | 9/2016 | Butcher | G06F 3/0488 |
| 2016/0259517 | A1* | 9/2016 | Butcher | G06F 3/0482 |

* cited by examiner

OPTIMIZED STORAGE OF MEDIA ITEMS

RELATED APPLICATIONS

This application claims priority to U.S. Provisional Application No. 62/348,974 filed on Jun. 12, 2016, entitled "Optimized Storage Of Media Items", which is incorporated herein by reference.

TECHNICAL FIELD

The present technology pertains to management of storage of media items on a computing device, and more specifically pertains to automatic selective deletion of cached media items on a computing device.

BACKGROUND

Even as computing devices have increased storage capacity, users of those computing devices seem to still reach capacity of the storage device. Accordingly, users can be offered a poor user experience when their computing devices run out of storage capacity and they still want to download additional media or applications.

In an attempt to solve this problem, software has been developed to manage storage of documents and other files. However, such software can still result in a poor user experience when it automatically deletes documents and other files that a user of the computing device may still be interested in.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, devices, methods, and non-transitory computer-readable storage media for optimizing storage on a computing device. In some embodiments a computing device can store media items in a cache to improve performance of the computing device, especially when a user of the computing device streams media items. In some embodiments, a media application on the computing device can allocate a minimum amount of storage on the computing device. The media application can further be configured to automatically download and store media items added to a media library of an account associated with the computing device. The combination of these features can put strain on computing devices with limited amounts of storage. Accordingly, the present technology can automatically delete media items in cache to allow media items to be automatically downloaded, or allow other uses of storage by other applications on the computing device, while also preserving the minimum amount of storage of media items on the computing device.

The present technology includes a method for managing storage on a computing device, wherein the storage includes a cache of streamed media items. In some embodiments, at least a portion of the streamed media items are also in a media library of an account associated with the computing device. The media library can be a media library of a content distribution system, which can store all of the media items in the media library of the account. A portion of the media items in the media library can also be stored on the computing device. The computing device can have an allocation of a minimum amount of storage space reserved for the combination of the cache of streamed media items and media items in the media library of the account that are stored on the computing device.

In some embodiments the method includes receiving, by a cached management application on the computing device, a notification from an operating system installed on the computing device to free disk space on the computing device. In response to the notification from the operating system to free disk space on the computing device, grouping the streamed media items into albums, and deleting at least a portion of the albums and associated media items in the cache, up to the minimum amount of storage space reserved for media items, according to a priority level associated with the notification from the operating system.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a technology that can better manage storage space on computing devices, and especially a technology that can manage storage space of media items. Managing storage space of media items is more important and complicated than in the past. Modern content distribution systems often offer subscription services that give devices access to download all media items available through the content distribution system. Since users of the devices don't need to pay for each item individually they may be less selective in the media items that they download. This problem can further be exacerbated when the system, such as the system described herein, allows for automatic download or caching of media items.

The present technology provides a mechanism by which storage of media items can be automatically managed in an intelligent way that takes into account the way in which a typical user of a client device accesses media items. In some embodiments, the present technology allows a user of the client device to specify a minimum storage space to be reserved for media items so that there will always be a minimum amount of media items stored locally on the client device. At the same time, the client device may store a greater amount of media items that storage management software can selectively manage.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances a user can refer to a user account associated with a particular electronic device.

Figure 1:
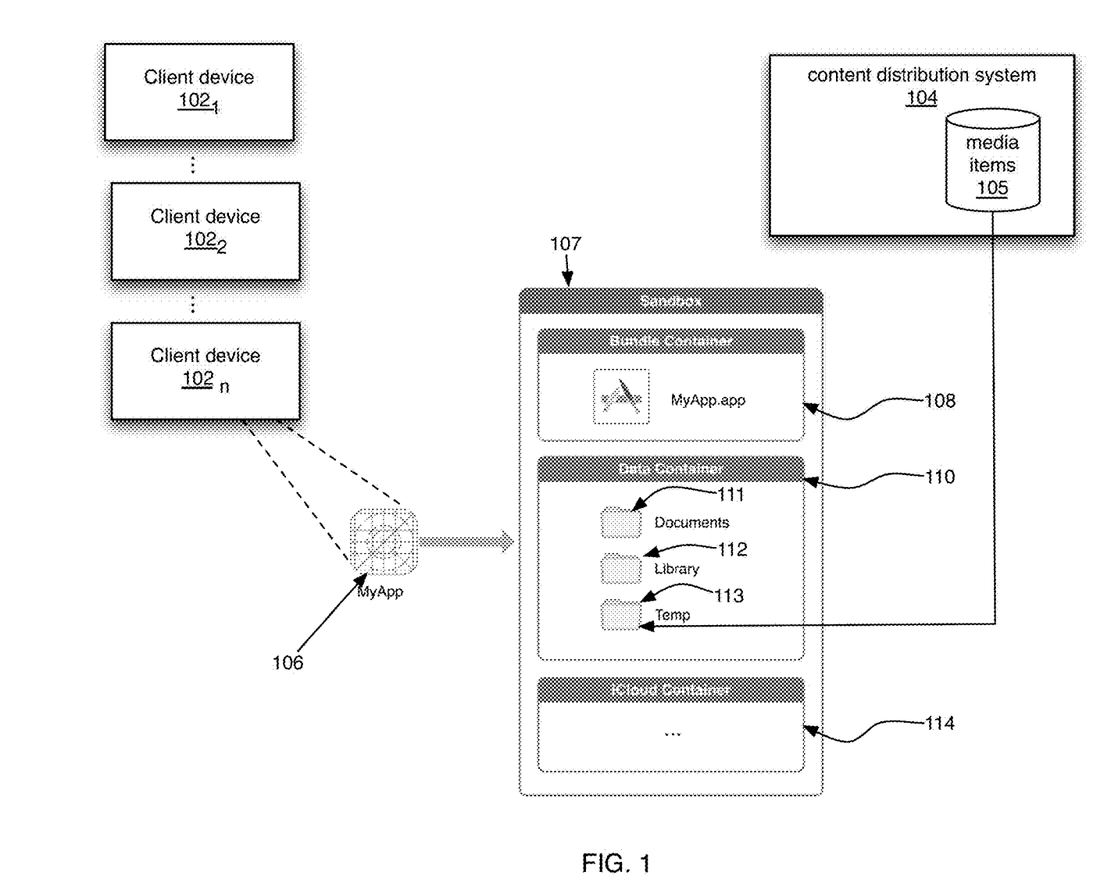
FIG. 1 illustrates an example system embodiment for use with the disclosed technology.

FIG. 1 illustrates an example system of the present technology. Client devices $102_1$, $102_2$, ... $102_n$ (collectively client device(s)) are associated with the same user account of content distribution system 104 and can have a copy of application 106 stored thereon. Application 106 can be used to interact with content distribution system 104. Content distribution system 104 can distribute different types of media items from media item storage 105 including songs videos, movies, and books etc.

For the purposes describing the present technology, application 106 is a media application for downloading media items and playback of media items, and in some embodiments is for download and playback of music media items. Application 106 can be stored in its own directory storage space and executed in its own dedicated environment called a sandbox 107. The application can be divided into logical parts including a bundle container 108, a data container 110, and cloud container 114. Bundle container 108 can include the necessary files for execution of the application. Data container can include a directory storing files used by the application. For example data container 110 includes a documents directory 111, a library directory 112, and a temporary directory 113. The documents directory 111 can be for storing user created and accessible files. In the context of application 106 this can include media items that are associated with an account of the content distribution system 104 that have been downloaded to the client device. The library directory 112 is a directory for storing files that are important to the functioning of the application, but should not be accessible to the user of client device 102. This includes cached files. In the context of the media application 106, cached files include media items streamed from the content distribution system 104. Temporary directory 113 can store truly temporary files that do not need to persist between launches of application 106. Cloud container 114 can include data items or pointers to data items stored in cloud storage accessible to application 106.

Figure 2:
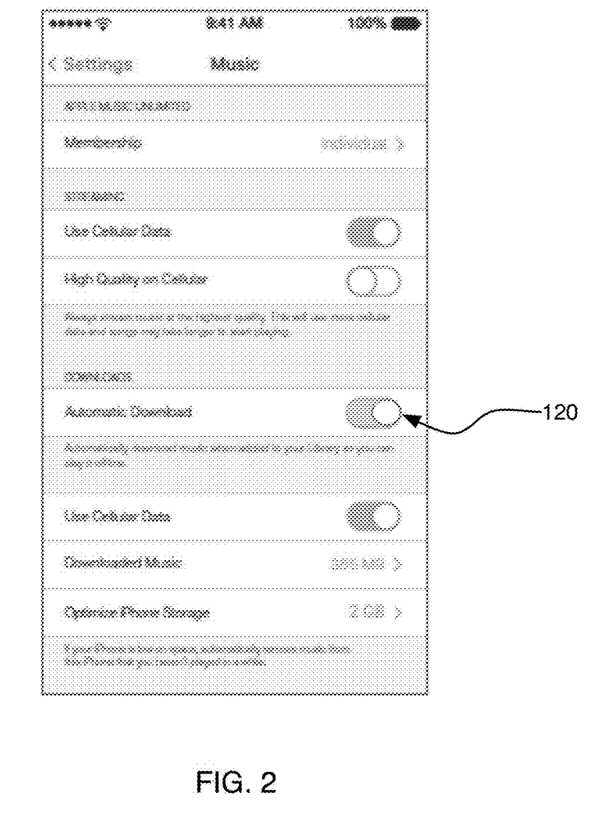
FIG. 2 illustrates an example settings graphical user interface for use with the disclosed technology.

In some embodiments, content distribution system 104, and client devices 102 support automatic downloading of media items. FIG. 2 illustrates an example screen of settings pertaining to application 106. FIG. 2 illustrates an example automatic downloads setting 120, which when selected allows the client device to automatically download media items added to a user account of the content distribution system 104.

Figure 3:
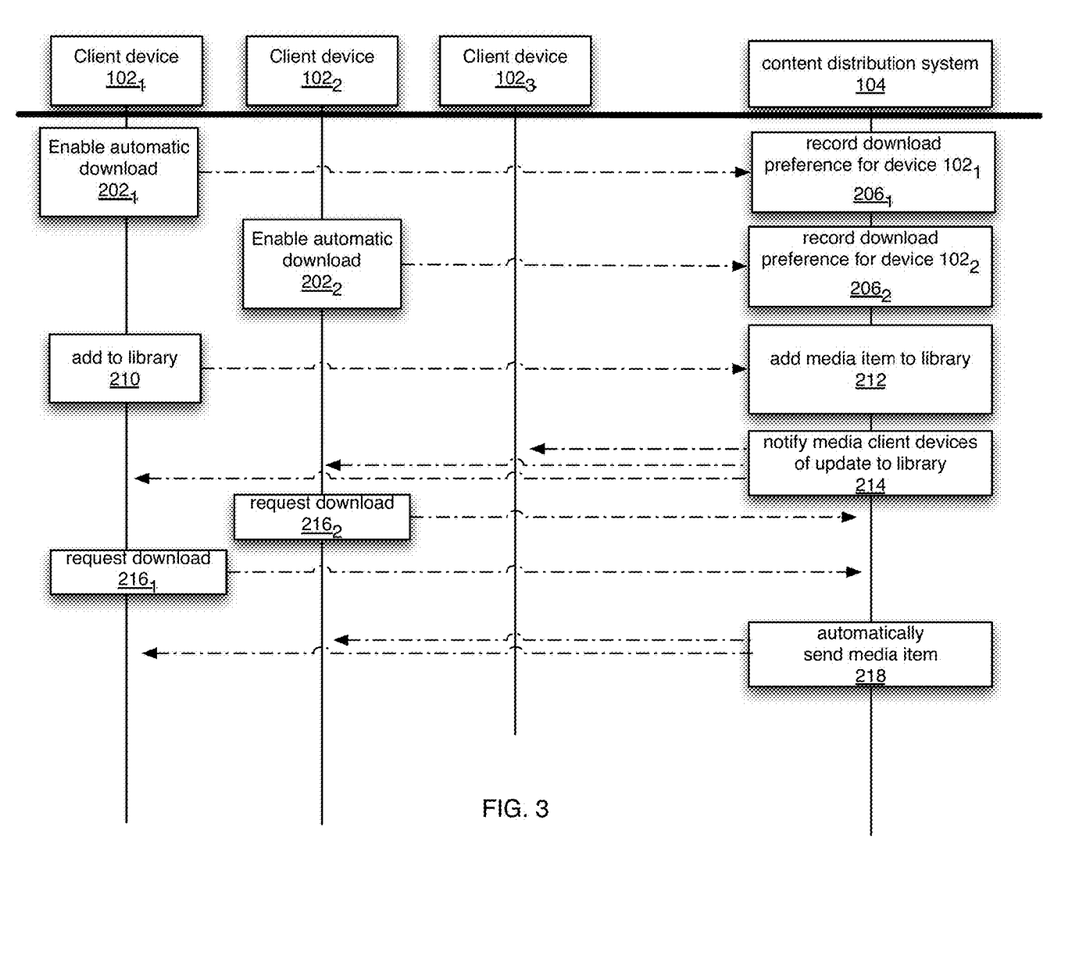
FIG. 3 illustrates an example sequence diagram.

In some embodiments, the automatic downloads feature is enabled per device. When a first device associated with a user account of the content distribution system enables the automatic download feature the automatic download feature is enabled for the account of the content distribution system 104. However, the feature must also be enabled on specific client devices. FIG. 3 illustrates an example of communication flow between multiple client devices associated with the same account of the content distribution system 104 enabling the automatic download feature, and FIG. 3 also illustrates how the content distribution system automatically delivers content to client devices having the automatic download feature enabled.

In FIG. 3, client device $102_1$ receives an input to enable the automatic download feature $202_1$. Client device $102_1$ communicates this election to the content distribution system 104, which can record $206_1$ the automatic download preference for device $102_1$. Client device $102_2$ also enables $202_2$ the automatic download feature and communicates this election to the content distribution system 104, which can record $206_2$ the download preference for device $102_2$. Client device $102_3$ does not have the automatic downloads feature enabled.

Client device $102_1$ receives an inputs from the user through a graphical user interface of application 106 to add 210 a media item to the media library of an account in the content distribution system 104 that is associated with client device $102_1$. Client device $102_1$ communicates this selection to the content distribution system 104, which adds 212 the media item to the account. Since automatic downloads are enabled on at least one device associated with the account, the content distribution system can then notify 214 each client device associated with the account ($102_1$, $102_2$, and $102_3$) that the media item is associated with the account, and can be downloaded. Client devices ($102_1$, $102_2$) that have the automatic download feature enabled can automatically request $216_1$, $216_2$, download of the media item, and content distribution system 104 can send the media item 218. Client device $102_3$ does not request the media item since automatic downloads have not been enabled on this device.

In some embodiments, content distribution system 104 can send the media item directly to the client devices ($102_1$, $102_2$) having automatic downloads enabled, or can forgo notifying client device $102_3$ since automatic downloads are not enabled on this device. Client device $102_3$ can still download any media item, however, a user would need to use application 106 to request that the media item be downloaded. In some embodiments client device $102_1$ might not receive a notification of the update to the library 214 since client device $102_1$ was used to add the media item to the library 210. In such embodiments $102_1$ can immediately begin downloading the media item.

In some embodiments, when client device ($102_1$, $102_2$) that has automatic downloads enabled receives a notification that a media item has been added to the media library of the account, application 106 on the client device can check to make sure that the client device does not already have a copy of the media item that may have been streamed to it earlier. If it has a streamed copy of sufficient quality, it can copy the cached streamed copy into a more permanent directory such as documents directory 111.

Figure 4:
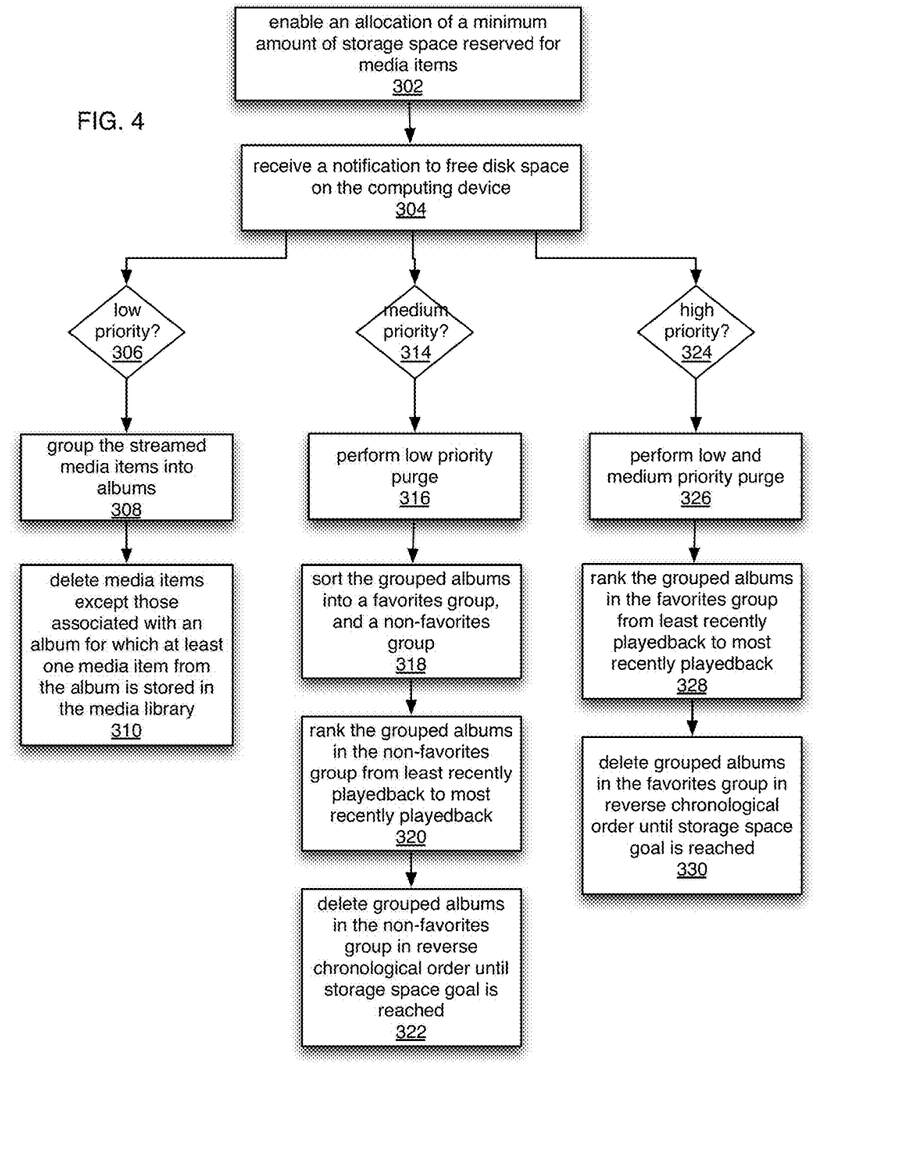
FIG. 4 illustrates an example method of optimizing storage on a device.

In systems such as the one described above where media items can be automatically downloaded to a client device, and streamed media items can be cached to be accessed later, the storage space available to the application 106 can quickly become full. Accordingly, it is desirable have a mechanism optimize the storage of media items on client device 102. FIG. 4 illustrates an example method for optimizing the storage media items on client device 102.

Figure 5A:
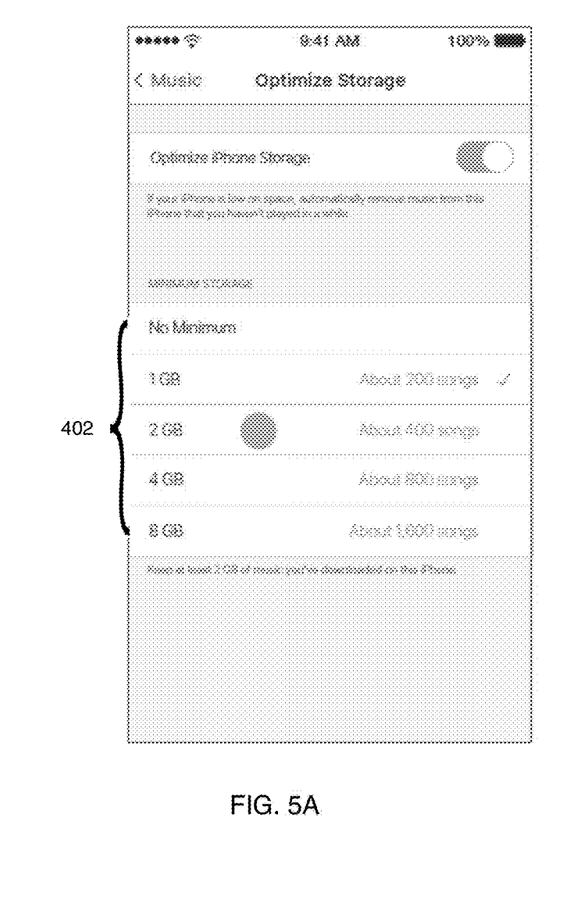
FIG. 5A illustrates an example graphical user interface for enabling and setting a minimum storage to be reserved for media items on the client device.

While downloaded and cached media items can quickly take up available storage space on client device 102, it is also important to balance the fact that a user of client device 102 might always like a minimum amount of storage space reserved for media items. As such a user of client device 102 can enable 302 an allocation of a minimum amount of storage space reserved for media items of the client device 102. An example user interface to reserve a minimum amount of storage space for media items is illustrated in FIG. 5A. The example user interface shown in FIG. 5A illustrates several selections 402 for possible minimum storage allocations. As illustrated in FIG. 5A, the user can indicate that they would not like a minimum storage space reserved, or they can reserve either 1 GB, 2 GB, 4 GB, and 8 GB of minimum storage space to be allocated for media items.

Figure 5B:
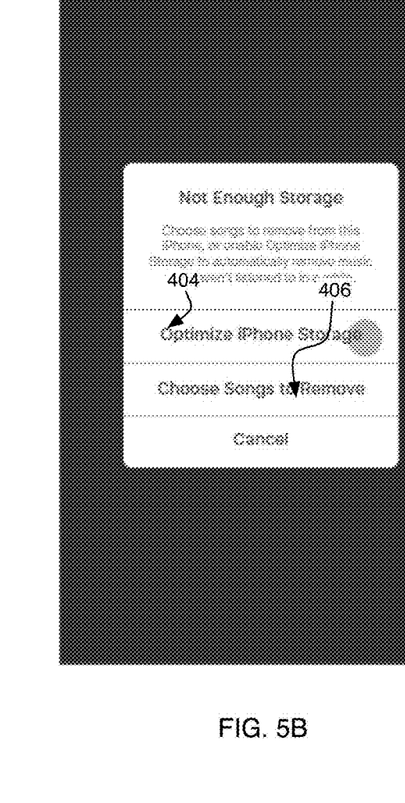
FIG. 5B illustrates an example graphical user interface for instructing the device to optimize storage on the device.

As the client device 102 is used to playback downloaded or streamed media items, the amount of storage used to store downloaded or cached media items can exceed the minimum allocated storage space reserved for media items. Eventually, it may be that all or most of the storage available on client device 102 becomes utilized. Whether the storage space was used by application 106 to store media items, or the storage was used by other applications, a memory management application of the operating system on the client device can create a notification, and application 106 can receive 304, the notification to free disk space on computing device 102. In some embodiments, as illustrated FIG. 5B a notification may cause a visible prompt to be displayed to the user of client device 102. Selection of the "Optimize Device" storage option 404 can cause application 106 to automatically optimize the storage utilized by that application. While FIG. 5B illustrates a user prompt, such prompt may not be necessary and application 106 can automatically optimize its storage.

In some embodiments, the notification can be accompanied by a priority level and/or a target amount of disk space to be freed. If the notification is a low priority level 306, the application 106 can group 308 the streamed media items stored in cache (library 112) into albums 308. The application 106 can delete 310 cached media items except those associated with an album for which at least one media item from the album is stored in the media library of the content distribution system 104. In some embodiments, in addition to being stored in the media library of the content distribution system 104, it may also be required that at least one media item from the album is stored on the client device 102 (e.g. in the documents directory associated with application 106).

In some embodiments, whenever one media item from an album is to be deleted, all media items from that album will be deleted. However, in no circumstance should so media items be deleted that client device 102 will have less media items than required to meet the minimum allocation of storage space reserved for media items (FIG. 5A). Thus, if application 106 would need to delete one media item from an album in order to meet the goal provided by a low priority notification, but deleting the entire album would cause the client device 102 to have less media items than needed to meet the minimum storage space allocation, then no media items from that album should be deleted.

If the notification is a medium priority level notification 314, application 106 can perform 316 all of the steps involved with a low priority purge. Additionally, application 106 can sort 318 the grouped albums into a favorites group and a non-favorites group. Then Application 106 can rank 320 the grouped albums in the non-favorites group from least recently playedback to most recently playedback.

In some embodiments, the albums are considered to have been playedback on the most recent date that at least one media item from that album was playedback. Then albums can be deleted 322 from the non-favorites group in reverse chronological order until the storage space goal associated with the medium priority notification is reached.

If the notification is a high priority level 324 notification, application 106 can perform 326 all of the steps associated with a low priority purge and a medium priority purge. Additionally, in the high priority purge, application 106 can rank 328 the albums in the favorites group from least recently playedback to most recently playedback. Then application 106 can delete 330 items in the favorites group in reverse chronological order until the storage space goal is reached.

Referring back to FIG. 5B, there is illustrated a user selectable option 406 to allow a user to choose songs to remove. A user may select this option if the user would like application 106 to sort media items that would be deleted if the user had selected the option 404 to have application 106 automatically optimize the storage for the application. In other words when option 406 is selected, application 106 performs the method illustrated in FIG. 4 as addressed above but instead of deleting media items, application 106 lists the media items in the interface illustrated in FIG. 5C.

Figure 5C:
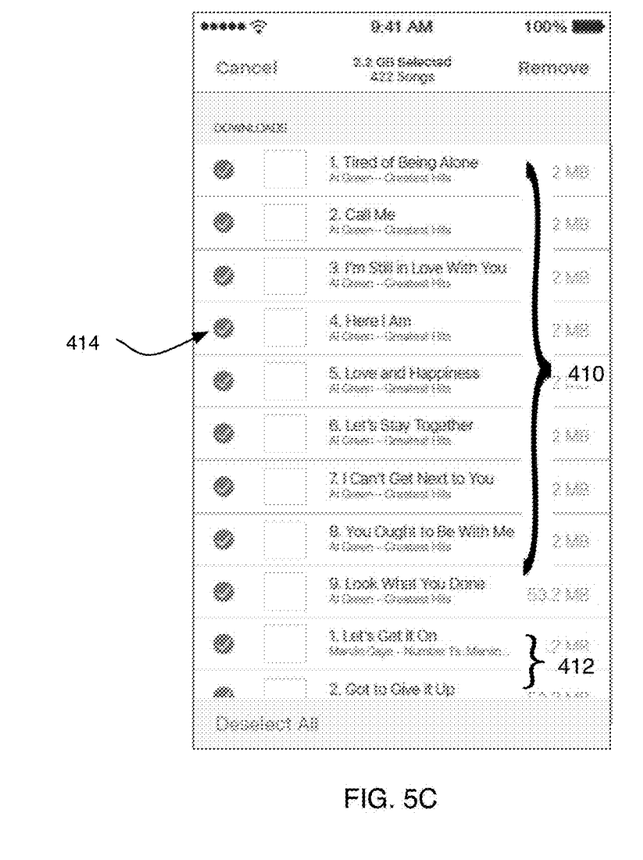
FIG. 5C illustrates an example graphical user interface that displays the output of a storage optimization process for confirmation or adjustment by a user of the device.

FIG. 5C illustrates a list of media items in the order in which application 106 suggests to delete the media items. As can be seen in FIG. 5C, the media items are grouped by album 410, 412 as indicated in the method illustrated in FIG. 4. Each media item is illustrated with a selection object 414 that can be used to select or deselect the media item for deletion. Since the interface illustrated in FIG. 5C offers the user of application 106 to make a choice about which media items are to be deleted, the rule that all media items associated album are kept or deleted together does not apply.

Figure 6A:
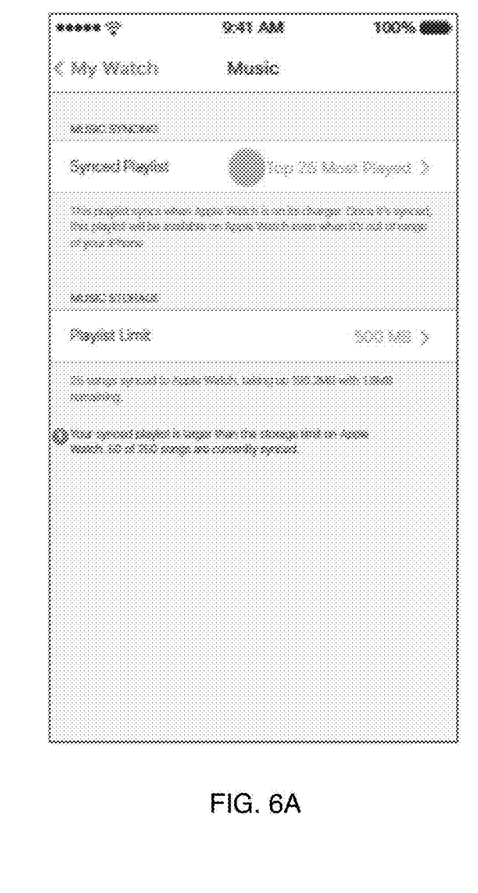
FIG. 6A illustrates an example graphical user interface for enabling and setting a maximum storage to be reserved for media items in a playlist on the client device.
Figure 6B:
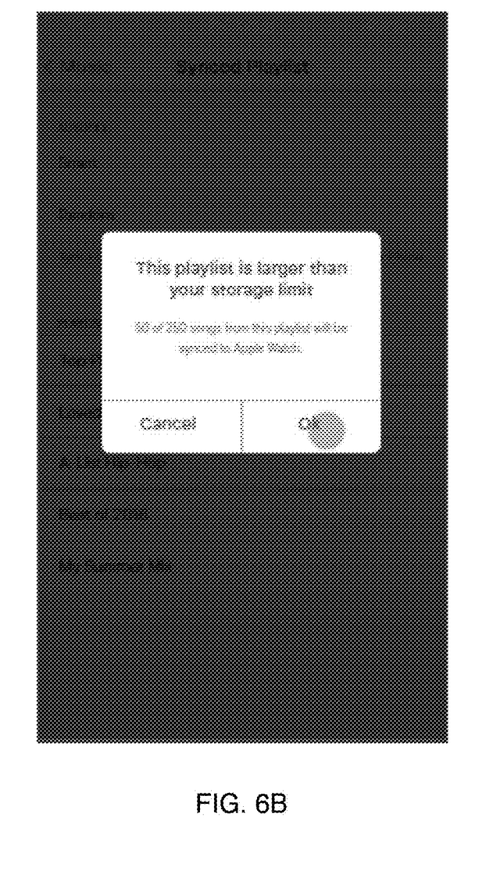
FIG. 6B illustrates an example graphical user interface notification that a playlist will exceed the maximum storage setting.

As addressed above it may be desirable to provide a minimum storage allocation for media items on client device 102. However, some devices have so little storage that, in some embodiments, it may be desirable to place a maximum storage allocation for media items. FIG. 6A illustrates an example screen for setting the maxim storage allocation on a device. As illustrated the limit is 500 MB. When it is attempted to store a collection of media items on the device that exceeds the maximum storage allocation a notification can be displayed as illustrated and FIG. 6B. The notification illustrated in FIG. 6B notifies a user that the collection of media items to be stored on the device exceeds the maximum storage allocation and that only a portion of the media items will be stored on the client device 102.

While the present technology has primarily been described in the context of media items such as songs that can be grouped into albums, the present technology is amenable to use with media items such as video that can be grouped into seasons. For example a series of TV shows maybe grouped into the seasons based on when they aired on television. In such embodiments, application 106 can attempt to group media items according to seasons, identify the most recently watched episode, and attempt to preserve episodes that come immediately after the recently watched episode so that those episodes are available to the user. Any TV shows for seasons of TV shows that do not have a recently watched episode could receive a lower priority for being preserved on the client device 102. As described above with respect to FIG. 4, media items can be deleted according to priority order. Other modifications required to intelligently manage the storage associated with application 106 with respect to media such as videos will be apparent to those of ordinary skill in the art.

In some embodiments, rather than delete media items it may also be possible to transcode media items down to a lower quality in order to reduce storage space required to store the media items. This could be especially useful when it is not desirable to delete media items or as an alternative to deleting media items. In such embodiments when application 106 receives a notification to free up storage space, it may be possible to degrade the quality of the media items so that they take up less storage space on client device 102.

Figure 7A:
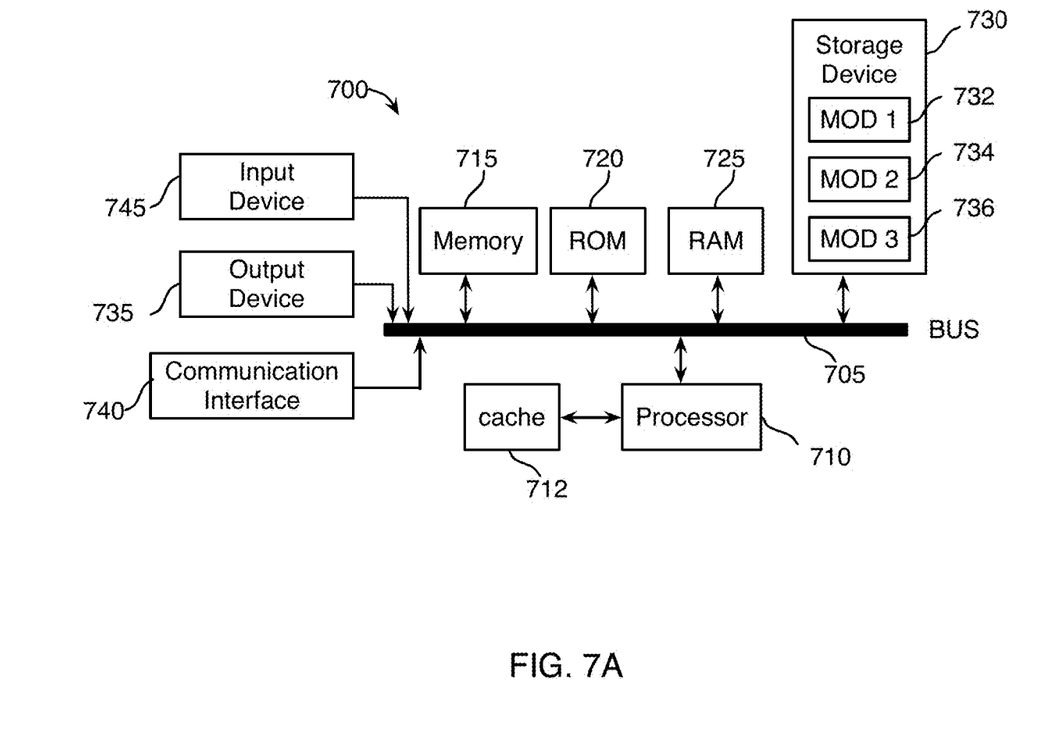
FIG. 7A and FIG. 7B illustrate example client device system architectures.
Figure 7B:
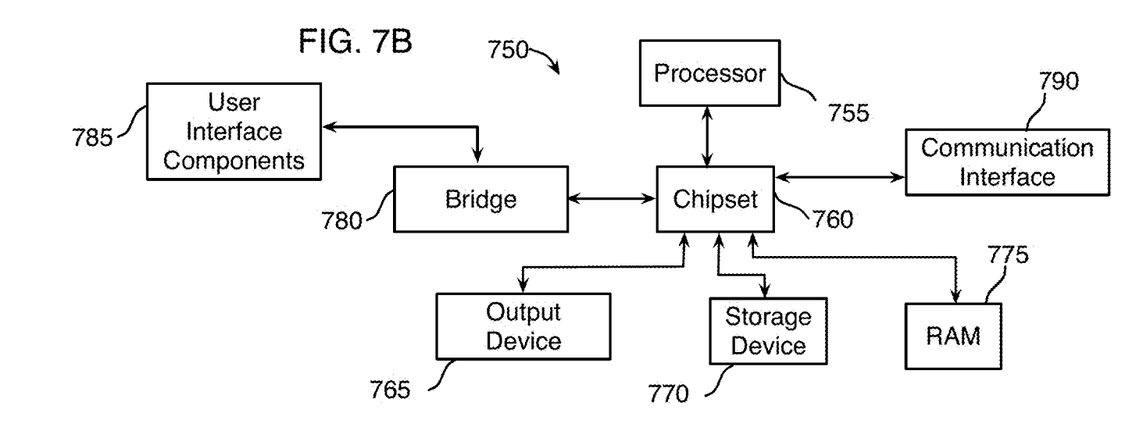

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. At least one non-transitory computer readable medium storing computer-executable instructions, the instructions, when executed, effective to cause a computing device to:
   enable an allocation of a minimum amount of storage space for one or more media items;
   receive, by a cache management application on the computing device, a notification from an operating system of the computing device to make available an amount of storage space on the computing device, wherein media items are stored in a cache, each of the media items being associated with an album from among a plurality of albums; and
   in response to receiving the notification from the operating system to make available an amount of storage space on the computing device,
   sort the plurality of albums into a not-in-library group including albums having no media item from the album associated with a media library of an account associated with the computing device, a favorites group including albums associated with at least one media item stored in the cache that is marked as a favorite, and an in-library-non-favorites group including all other albums;
   rank the albums in each group from least recently playedback to most recently playedback, wherein an album playback date is the date that a most recently playedback media item from the album was playedback; and
   delete, up to the allocated minimum amount of storage space, media items in reverse chronological order with respect to the playback date of the album with the media item is associated, starting with media items associated with albums in the not-in-library group, then media items associated with albums of the in-library-non-favorites group, and then media items associated with albums in the favorites group, until the amount of storage space to make available has been made available.

2. The at least one non-transitory computer readable medium of claim 1, wherein the instructions are further effective to cause the computing device to:
   receive a notification associated with a first priority level; and
   in response to receiving the notification associated with the first priority level, delete all media items stored in the cache except those associated with an album from the plurality of albums for which at least one media item from the album is also in a media library of an account associated with the computing device.

3. The at least one non-transitory computer readable medium of claim 2, wherein the instructions are further effective to cause the computing device to:
   receive a notification associated with a second priority level; and
   in response to receiving the notification associated with the second priority level:
   execute instructions associated with a first priority level notification;
   sort the plurality of albums into a favorites group, and a non-favorites group, the favorites group including an album from the plurality of albums associated with at least one song stored in the cache that is marked as a favorite;
   rank the albums in the non-favorites group from least recently playedback to most recently playedback, wherein an album playback date is the date that a most recently playedback media item from the album was playedback; and delete a plurality of media items associated with albums in the non-favorites group in reverse chronological order such that media items associated with least recently playedback albums are deleted before more recently playedback albums.

4. The at least one non-transitory computer readable medium of claim 3, wherein the instructions are further effective to cause the computing device to:

receive a notification associated with a third priority level; and in response to receiving the notification associated with the third priority level notification:

perform instructions associated with a first priority level notification and a second priority level notification;

delete any remaining media items associated albums from the plurality of albums in the non-favorites group;

rank the plurality of albums in a favorites group from least recently playedback to more recently playedback, wherein an album playback date is the date that a most recently playedback media item from the album was playedback; and delete one or more media items associated with the plurality of albums in the favorites group in reverse chronological order such that media items associated with least recently playedback albums are deleted before media items associated with more recently playedback albums.

5. The at least one non-transitory computer readable medium of claim 1, wherein the instructions are further effective to cause the computing device to:

request to download a new media item from a content distribution system;

determine that additional storage space is needed to store the new media item; and after having deleted the media items in reverse chronological order with respect to the playback date of the album with the media item is associated download the new media item.

6. The at least one non-transitory computer readable medium of claim 5, wherein the instructions effective to cause the computing device to request to download a new media item from a content distribution system comprise instructions to automatically request a new media item in response to receiving a notification by the content distribution system informing the computing device of an update to a media library of an account associated with the computing device.

7. The at least one non-transitory computer readable medium of claim 1, wherein the instructions are further effective to cause the computing device to:

display a graphical user interface listing one or more media items stored in the cache, the one or more media items being listed in an order in which the one or more media items are to be deleted; and receive an input within the graphical user interface indicating that one or more of the one or more media items listed should not be deleted.

8. The at least one non-transitory computer readable medium of claim 1, wherein the media items were stored in the cache by a media playback application allowing streaming of media items through a subscription and purchase of media items without subscription, the media playback application allowing addition of at least one of the media items streamed through the subscription to a media library along with any purchased media items.

9. A computing device comprising:

a media playback application configured to stream media items from a media streaming service, and store the streamed media items in a cache, the media playback application including a setting effective to reserve a minimum amount of storage space for one or more media items;

an operating system configured to manage storage services for applications including the media playback application, and to notify applications of a storage level condition;

a cache management application configured to receive a notification from the operating system to make available an amount of storage space on the computing device, wherein the cache management application is further configured to, in response to receiving the notification from the operating system to make available an amount of storage space available on the computing device, group the streamed media items into a plurality of albums;

sort the plurality of albums into a not-in-library group including albums having no media item from the album associated with a media library of an account associated with the computing device, a favorites group including albums associated with at least one media item stored in the cache that is marked as a favorite, and an in-library-non-favorites group including all other albums;

rank the albums in each group from least recently playedback to most recently playedback, wherein an album playback date is the date that a most recently playedback media item from the album was playedback; and delete, up to the reserved minimum amount of storage space, media items in reverse chronological order with respect to the playback date of the album with the media item is associated, starting with media items associated with albums in the not-in-library group, then media items associated with albums of the in-library-non-favorites group, and then media items associated with albums in the favorites group, until the amount of storage space to make available has been made available.

10. The computing device of claim 9, wherein the media playback application is further configured to:

request to download a new media item from a content distribution system;

determine that additional storage space is needed to store the new media item;

delete, up to the reserved minimum amount of storage space, media items until the additional storage space is available; and download the new media item.

11. The computing device of claim 10, wherein the request to download a new media item from a content distribution system comprises a request to automatically download a new media item in response to receiving a notification by the content distribution system informing the computing device of an update to a media library of an account associated with the computing device.

12. The computing device of claim 9, wherein the cache management application is further configured to:

display a graphical user interface listing a plurality of media items stored in the cache, the plurality of media items being listed in a suggested order in which the plurality of media items are suggested to be deleted.

13. The computing device of claim 12, wherein the cache management application is further configured to:
receive an input within the graphical user interface indicating that one or more of the plurality of media items suggested for deletion should not be deleted.

14. The computing device of claim 9, wherein the streamed media items include media items having been stored in the cache by a second media playback application allowing streaming of media items through a subscription, and allowing purchase of media items without subscription, the second media playback application allowing addition of at least one media item streamed through the subscription to a media library along with any purchased media items.

15. A method for managing storage on a computing device, the method comprising:
receiving, by a cache management application on the computing device, a notification from an operating system on the computing device to make available an amount of storage space on the computing device, wherein media items are stored in a cache, each of the media items being associated with an album from among a plurality of albums; and
in response to receiving the notification from the operating system to make available space on the computing device, sorting the plurality of albums into a not-in-library group including albums having no media item from the album associated with a media library of an account associated with the computing device, a favorites group including albums associated with at least one media item stored in the cache that is marked as a favorite, and an in-library-non-favorites group including all other albums;
ranking the albums in each group from least recently playedback to most recently playedback, wherein an album playback date is the date that a most recently playedback media item from the album was playedback; and
deleting media items in reverse chronological order with respect to the playback date of the album with the media item is associated, starting with media items associated with albums in the not-in-library group, then media items associated with albums of the in-library-non-favorites group, and then media items associated with albums in the favorites group, until the amount of storage space to make available has been made available.

16. The method of claim 15 for managing storage on a computing device, further comprising:
requesting to download a new media item from a content distribution system;
determining that additional storage space is needed to store the new media item;
deleting media items until the additional storage space is available;
downloading the new media item.

17. The method of claim 15 for managing storage on a computing device, further comprising:
displaying a graphical user interface listing media items stored in the cache, the media items being listed in an order in which the media items a to be deleted; and
receiving an input within the graphical user interface indicating that one or more of the listed media items should not be deleted.

18. The non-transitory computer readable medium of claim 1, wherein the notification is responsive to a detection that a maximum amount of storage space reserved for media items has been exceeded.

* * * * *

UNITED STATES PATENT AND TRADEMARK OFFICE
CERTIFICATE OF CORRECTION

PATENT NO. : 10,205,989 B2
APPLICATION NO. : 15/273406
DATED : February 12, 2019
INVENTOR(S) : Thomas Alsina et al.

Page 1 of 1

It is certified that error appears in the above-identified patent and that said Letters Patent is hereby corrected as shown below:

In the Claims

Claim 17 at Column 14, Line 27 should read -- order in which the media items are to be deleted; and --

Signed and Sealed this
Twenty-third Day of April, 2019

Andrei Iancu
*Director of the United States Patent and Trademark Office*